United States Patent
Dathathraya

(10) Patent No.: US 6,934,932 B2
(45) Date of Patent: Aug. 23, 2005

(54) SYSTEM AND METHOD FOR MANAGING WORKFLOW USING A PLURALITY OF SCRIPTS

(75) Inventor: Sridhar Dathathraya, Cerritos, CA (US)

(73) Assignee: Sharp Laboratories of America, Inc., Camas, WA (US)

( * ) Notice: Subject to any disclaimer, the term of this patent is extended or adjusted under 35 U.S.C. 154(b) by 652 days.

(21) Appl. No.: 09/978,488

(22) Filed: Oct. 16, 2001

(65) Prior Publication Data

US 2004/0205455 A1 Oct. 14, 2004

(51) Int. Cl.[7] .............................................. G06F 9/44
(52) U.S. Cl. ....................... 717/115; 717/102; 715/500; 719/320; 705/8
(58) Field of Search ................................ 717/100–103, 717/114–115, 168–169, 174–175; 715/500; 719/320; 705/8

(56) References Cited

U.S. PATENT DOCUMENTS

| | | | | |
|---|---|---|---|---|
| 5,946,458 A | * | 8/1999 | Austin et al. | 358/1.15 |
| 6,038,541 A | * | 3/2000 | Tokuda et al. | 705/8 |
| 6,401,073 B1 | * | 6/2002 | Tokuda et al. | 705/8 |
| 6,678,705 B1 | * | 1/2004 | Berchtold et al. | 707/204 |
| 6,775,729 B1 | * | 8/2004 | Matsuo et al. | 710/263 |
| 2001/0016807 A1 | * | 8/2001 | Hashima et al. | 703/22 |
| 2002/0165883 A1 | * | 11/2002 | Sans et al. | 707/530 |
| 2003/0037325 A1 | * | 2/2003 | Hargrove et al. | 717/175 |
| 2003/0038977 A1 | * | 2/2003 | Green | 358/402 |

FOREIGN PATENT DOCUMENTS

JP    07085004 A    3/1995    ........... G06F/15/20

OTHER PUBLICATIONS

Moncour, Sams Teach Yourself JavaScript in 24 Hours, Oct. 2000, Sams Publishing, second Edition, Chapter Understandin JAVASCRIPT.*

* cited by examiner

Primary Examiner—Anthony Nguyen-Ba
(74) Attorney, Agent, or Firm—David C. Ripma; Joseph P. Curtin

(57) ABSTRACT

A system and method are provided for managing workflow, using a plurality of scripts, in a workflow system. The method comprises: selecting an MFP device at which the document is to be processed; supplying a plurality of folders with a corresponding plurality of scripts; selecting a first number of folders; processing a document using processes such as faxing, scanning, copying, and printing; adding the processed document to the selected folders; and, in response to adding the processed document to a first number of selected folders, generating the document in a first number of scripts.

14 Claims, 2 Drawing Sheets

SYSTEM AND METHOD FOR MANAGING WORKFLOW USING A PLURALITY OF SCRIPTS

BACKGROUND OF THE INVENTION

1. Field of the Invention

This invention generally relates to workflow management and, more particularly, to a system and method for managing workflow using a plurality of different scripts.

2. Description of the Related Art

Workflow is a concept that can he expressed as the automatic routing of documents to the users responsible for working on them, "work-flow" on the techweb website. Workflow is concerned with providing the information required to support each step of the business cycle. The documents may be physically moved over the network, or maintained in a single database with the appropriate users given access to the data at the required times. Triggers can be implemented in the system to alert managers when operations are overdue. Alternately stated, workflow is a defined series of tasks within an organization to produce a final outcome, see "workflow" on the webopedia website. In general practice, workflow is a defined set of actions or procedures that occur to a document, after the document is scanned, faxed, or copied into a selected folder.

The manual flow of documents in an organization is prone to errors. Documents can get lost or be constantly shuffled to the bottom of the in basket. Automating workflow sets timers that ensure that documents move along at a prescribed pace and that the appropriate person processes them in the correct order.

Integrating workflow into existing software applications may require extensive reprogramming because, although independent workflow software can launch a whole application, a workflow system must be able to invoke individual routines within the application. As a result, vendors of application software have teamed up with workflow vendors to provide the appropriate interfaces and/or they have developed their own workflow capability. Workflow standards developed by the Workflow Management Coalition (WFMC) are expected to provide interoperability between workflow software and the applications as well as between different workflow systems.

Workflow software is not the same as workgroup software, otherwise known as groupware. Workflow deals with the step-by-step processes, whereas workgroup systems are concerned with information sharing and threaded discussions among users. Groupware, or workgroup computing, focuses on the information being processed and enabling users to share information. Workflow, on the other hand, emphasizes the importance of the process, which acts as a container for the information. Workflow combines rules, which govern the tasks performed, and coordinates the transfer of the information required to support these tasks. This is "process-centered" rather than "information-centered."

Sophisticated workgroup computing applications permit a user to define different workflows for different types of jobs. For example, in a publishing setting, a document might be automatically routed from writer to editor to proofreader to production. At each stage in the workflow, one individual or group is responsible for a specific task. Once the task is complete, the workflow software ensures that the individuals responsible for the next task are notified and receive the data they need to execute their stage of the process.

A workgroup is a collection of individuals working together on a task. Workgroup computing occurs when all the individuals have computers connected to a network that allows them to send email to one another, share data files, and schedule meetings. Sophisticated workgroup systems allow users to define workflows so that data is automatically forwarded to appropriate people at each stage of a process.

A script is a special-purpose command language used to automate sequences within an application such as a spreadsheet or word processor. Macro languages often include programming controls (IF THEN, GOTO, WHILE, etc.), but rarely have the capabilities of a full-blown programming language. Another term for macro or batch file, a script is a list of commands that can be executed without user interaction, see "script" on the webopedia website.

As noted in U.S. Pat. No. 5,960,404 (Chaar et al.), workflow systems are essential to organizations that need to automate their business processes. Workflow systems allow organizations to specify, execute, and monitor their business processes in an efficient manner over enterprise-level networks. This has the net effect of improved throughput of processes, better utilization of organizational resources, and improved tracking of processes.

Many workflow systems are commercially available. Even though many workflow systems exist, interoperability across these systems is a technical problem. The systems are monolithic and proprietary, and workflows cannot extend beyond a single workflow system. To solve this problem, the Workflow Management coalition (WfMC), an industry-wide consortium of major workflow system vendors, has defined a standard workflow architecture, described in the document "The Workflow Reference Model" (WFMC-TC-1003). The model defines the major components of a workflow system and a set of interfaces between workflow system components. The major components it describes are a Process Definition or Builder Tool to capture business process logic in a high-level notation; a Workflow Server that acts as the nerve center of the workflow system; Workflow Clients that are used by users to view and interact with the contents of their worklists; Workflow Applications that are invoked by the workflow server to perform automated activities; and finally, Administration & Monitoring Tools used to administer the execution and monitor the status of work flowing through the workflow system using Audit Data.

The WFMC Reference Model also defines interfaces between these components. Interface 1 (builder-server interface) defines a common process definition format for the interchange of static process specifications between a Process Definition Tool and a Workflow Server (WFMC-WG01-1000). Interface 2 (client-server interface) defines an API that provides a complete range of interactions between a Workflow Client and a Workflow Server (WFMC-TC-1009). These include worklist interaction, query and control of workflow processes and their activities, and administrative functions. Interface 3 (application invocation interface) is intended to describe how applications are invoked. Interface 4 (server-server interface) defines an API that describes the interactions between two Workflow Servers (WFMC-TC-1012). Interactions include initiation, query and control of workflow processes and their activities, and administrative functions. Finally, Interface 5 (monitor-server interface) defines audit data for administrating and monitoring a Workflow Server (WFMC-TC-1015).

Workflow typically involves processing documents created by capturing devices, such as a scanner or a facsimile (fax). When a user wants to process documents created by capturing devices, they typically run applications such as 'Flow Manager'. These capturing devices can be configured to send the captured data, or documents to a specific folder in the users computer. Even though these workflow applications can be configured to watch some folders on the users personal computer (PC) or computer workstation, it does not allow the user to run different scripts on different folders. To overcome this problem the user must run multiple instances of these applications. This is inconvenient, and in some applications impossible because the application may not permit the user to run multiple instances.

Recent versions of Windows permit users to customize a folder by using scripts, but these scripts are run only when the user has the folders opened. Applications such as Flow Manager can be configured to watch folders for files that are being created. But these applications run the same script on all the watched folders.

It would be advantageous if a plurality of scripts could be generated, in parallel, for any particular processed document.

It would be advantageous if the user could easily generate and edit the plurality of workflow scripts.

SUMMARY OF THE INVENTION

The objective of this invention is to enhance the workflow processing in an office environment. This invention removes the need for running an application to do workflow processing. This invention allows the user to specify different workflow for different folders, which will run automatically when a document arrives in these folders. That is, the invention enhances workflow processing by integrating workflow into the operating system, permitting the user to run different scripts on different folders automatically.

Accordingly, a method is provided for managing workflow, using a plurality of scripts, in a workflow system. The method comprises: selecting a multifunction peripheral (MFP) device at which the document is to be processed; supplying a plurality of folders with a corresponding plurality of scripts; selecting a first number of folders; processing a document using processes such as faxing, scanning, copying, and printing; adding the processed document to the selected folders; and, in response to adding the processed document to a first number of selected folders, generating the document in a first number of scripts.

The system typically includes at least one computer workstation with an operating system, connected to a MFP device. Then, the method further comprises: installing a shell extension to the computer operating system; in response to accessing the shell extension, generating the first number of folders; writing a script for each of the first number of folders using a protocol selected from the group including Java™ and VB™; in response to accessing the shell extension, selecting folders for editing; editing the scripts in the selected folders; and, saving the folders.

Additional details of the above-mentioned method for managing workflow using a plurality of scripts, and a system for managing workflow using a plurality of scripts are provided below.

DETAILED DESCRIPTION OF THE PREFERRED EMBODIMENTS

Some portions of the detailed descriptions that follow are presented in terms of procedures, steps, logic blocks, codes, processing, and other symbolic representations of operations on data bits within a microprocessor or memory. These descriptions and representations are the means used by those skilled in the data processing arts to most effectively convey the substance of their work to others skilled in the art. A procedure, microprocessor executed step, application, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a microprocessor device. It has proven convenient at times, principally for reasons of common usage, to refer to these signals as bits, values, elements, symbols, characters, terms, numbers, or the like. Where physical devices, such as a memory are mentioned, they are connected to other physical devices through a bus or other electrical connection. These physical devices can be considered to interact with logical processes or applications and, therefore, are "connected" to logical operations. For example, a memory can store or access code to further a logical operation, or an application can call a code section from memory for execution.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "connecting" or "translating" or "displaying" or "prompting" or "supplying" or "allocating" or "establishing" or "selecting" or "storing" or "receiving" or "determining" or "displaying" or "recognizing" or the like, refer to the action and processes of in a microprocessor system that manipulates and transforms data represented as physical (electronic) quantities within the computer system's registers and memories into other data similarly represented as physical quantities within the wireless device memories or registers or other such information storage, transmission or display devices.

Figure 1:
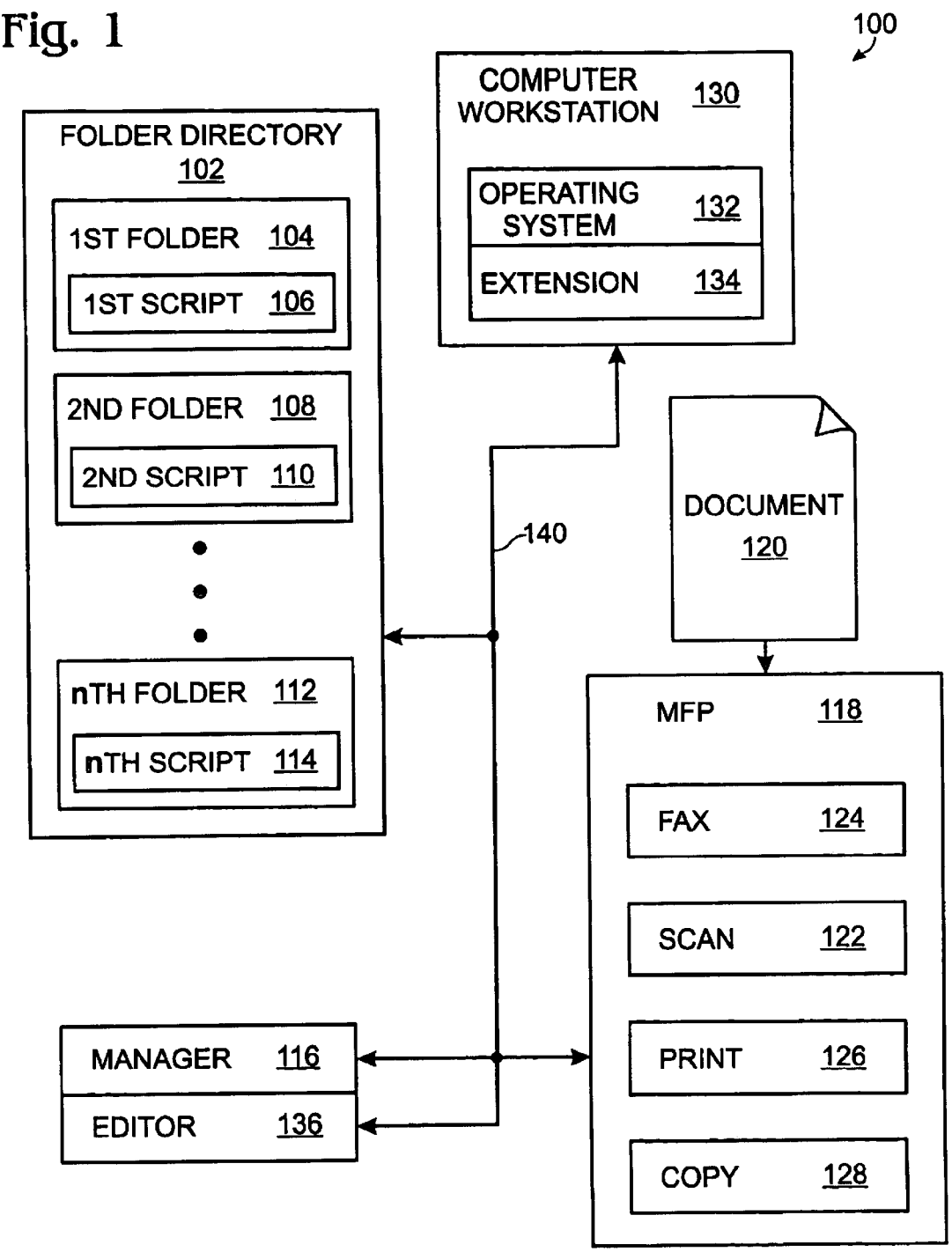
FIG. 1 is a schematic block diagram of the present invention system for managing workflow using a plurality of scripts.

FIG. 1 is a schematic block diagram of the present invention system for managing workflow using a plurality of scripts. The system 100 comprises a folder directory 102 including a plurality of folders with a corresponding plurality of scripts. Shown are a first folder 104 with a first script 106, a second folder 108 with a second script 110, and an nth folder 112 with an nth script 114. However, the present invention is not limited to any particular number of folders or scripts.

A manager 116 selects folders in the file directory 102. The system 100 includes at least one multifunctional peripheral (MFP) device to process an accepted document 120, and to add the processed document to the selected folders in the file directory 102. Typically, a processed document is an electronic representation of a paper document processed by the MFP. In the broader sense, a document is data that can be processed and scripted. Shown is MFP device 118, but the invention is not limited to any particular number of devices. The MFP device 118 processes, or functions are selected from the group including scanning 122, faxing 124, printing 126, and copying 128.

For example, the manager 116 selects a first number of folders, say the first folder 104 and the second folder 108. The folder directory 102 accepts the processed document from the MFP device 118 and generates a first number of scripted documents, in this case two scripts. The folder directory 102 adds the scripted documents to the selected folders.

The system 100 comprises at least one computer workstation 130 with an operating system 132, connected to the MFP device 118. Shown is computer workstation 130, but the invention is not limited to any particular number of computer workstations. A shell extension 134 is connected to the computer operating system 132. The manager 116 accesses the shell extension 134 to generate the first number of folders in the file directory 102, and to write a script for each of the first number of folders in the file directory 102.

The system also comprises an editor 136 to access the shell extension 134. The editor 136 selects folders in the file directory 102 for editing, and edits the scripts in the selected folders. The manager 116 saves the folders in the file directory 102 after they have been generated or edited. Generally, the manager 116 writes a script for each of the first number of folders using a protocol selected from the group including Java™ and VB™. Likewise, the editor 136 uses Java™ or VB™ to edit the scripts.

It should be understood that in various aspects of the invention that the manager 116, editor 136, and file directory 102 may reside with either the computer workstation 130 or the MFP 118. It should also be understood that the manager 116, editor 136, and file directory 102 need not be co-located. The connections, or the network 140 between elements not are not co-located can be made through the Internet or through conventional intranet networks.

System Operation

The user must first install the present invention shell extension on a conventional computer workstation. This extension permits the user to add or edit the scripts in the folders. The operation continues as follows:

1. the user launches an explorer to access either the manager or the editor;
2. the user either selects an existing folder or creates a new folder;
3. using a context menu the user selects the add/edit workflow option;
4. the user enters a new script, or edits an exiting script in either VB™ or Java™;
5. the user saves the script;
6. the user walks to the MFP;
7. the user configures the MF to send the output to the desktop and selects a workstation;
8. the user uses the network scan tool to add a process that will move the document from that scanner to the folder created in Step 2.

Figure 2:
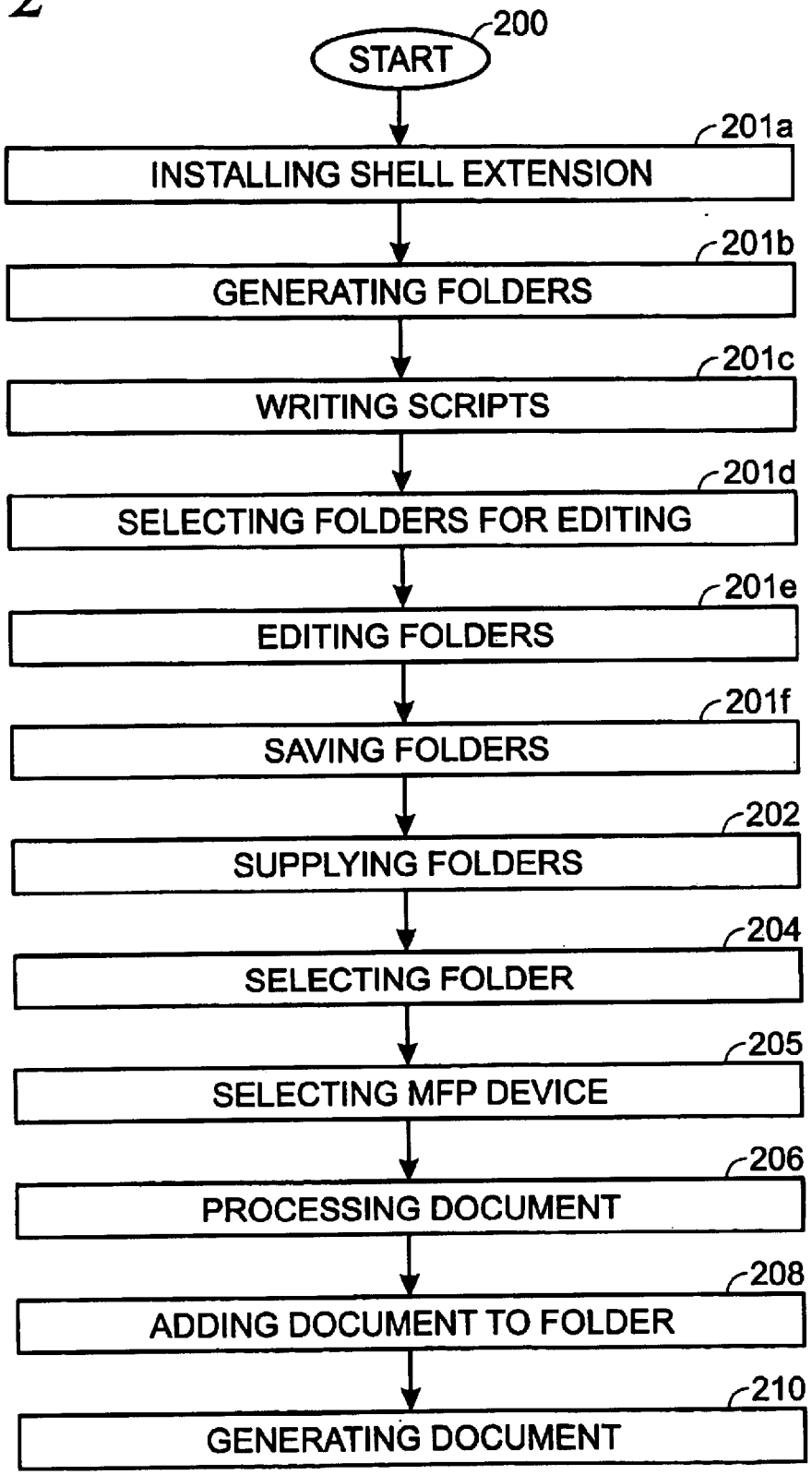
FIG. 2 is a flowchart illustrating the present invention method for managing workflow using a plurality of scripts in a workflow system.

FIG. 2 is a flowchart illustrating the present invention method for managing workflow using a plurality of scripts in a workflow system. Although the method is depicted as a sequence of numbered steps for clarity, no order should be inferred from the numbering unless explicitly stated. The method starts at Step 200. Step 202 supplies a plurality of folders with a corresponding plurality of scripts. Step 204 selects a first number of folders. Step 206 processing a document. Step 208 adds the processed document to the selected folders. Step 210, in response to adding the processed document to a first number of selected folders, generates the document in a first number of scripts.

The system includes at least one multifunctional peripheral (MFP) device with functions comprising scanning, faxing, printing, and copying. Then, processing a document in Step 206 includes using processes selected from the group including scanning, faxing, printing, and copying. Step 205 selects an MFP device at which the document is to be processed.

The system also includes at least one computer workstation with an operating system, connected to a MFP device. Then, the method comprises further steps. Step 201a installs a shell extension to the computer operating system. Step 201b, in response to accessing the shell extension, generates the first number of folders. Step 201c writes a script for each of the first number of folders. Step 201d, in response to accessing the shell extension, selects folders for editing. Step 201e edits the scripts in the selected folders. Step 201f saves the folders.

Writing a script for each of the first number of folders in Step 201c includes writing a script using a protocol selected from the group including Java™ and VB™.

A system and method have been provided for managing a workflow using a plurality of scripts. Examples have been given for the creation, editing, and use of the present invention workflow process in a Windows environment. However, other variations and embodiments of the invention will occur to those skilled in the art.

I claim:

1. In a workflow system, a method for managing workflow using a plurality of scripts, the method comprising:
   supplying a plurality of folders with a corresponding plurality of scripts;
   supplying a document that can be processed using any of the plurality of scripts;
   selecting a first number of folders;
   processing the document using the script from each selected folder;
   creating a first number of scripted documents; and
   adding the scripted document to the selected folders.

2. The method of claim 1 in which at least one multifunctional peripheral (MFP) device is supplied with functions comprising scanning, faxing, printing, and copying; and
   wherein processing a document using the script from each selected folder includes using processes selected from the group including scanning, faxing, printing, and copying.

3. The method of claim 1 in which at least one computer workstation with an operating system is supplied, connected to a multifunctional peripheral (MFP) device;
   the method further comprising:
   installing a shell extension to the computer operating system;
   in response to accessing the shell extension, generating the first number of selected folders; and
   writing a script for each of the first number of folders.

4. The method of claim 3 further comprising:
   in response to accessing the shell extension, selecting folders for editing; and
   editing the scripts in the selected folders.

5. The method of claim 4 further comprising:
   saving the folders.

6. The method of claim 1 further comprising:
   selecting an multifunctional peripheral (MFP) device at which the document is to be processed.

7. In a workflow system including a computer workstation and a multifunctional peripheral (MFP) device, a method for managing workflow using a plurality of scripts, the method comprising:

installing a shell extension to the computer operating system;

in response to accessing the shell extension, generating a plurality of folders;

writing a script for each of the plurality of folders selected from the group including scanning, faxing, printing, and copying;

saving the plurality of folders;

supplying the plurality of folders with the corresponding plurality of scripts;

prior to accepting a document pre-selecting a first number of folders;

supplying a document capable of being processed by any of the plurality of scripts;

processing the document using the script from each selected folder;

generating a first number of scripted documents; and adding the scripted document to the selected folders.

8. A system for managing workflow using a plurality of scripts, the system comprising:

a folder directory including a plurality of folders with a corresponding plurality of scripts;

a manager to select folders in the folder directory; and at least one multifunctional peripheral (MFP) device to accept a document capable of being processed using any of the plurality of scripts, to process the document using script from the selected folders, and to add the scripted document to the selected folders.

9. The system of claim 8 wherein the MFP device functions are selected from the group including scanning faxing, printing, and copying.

10. The system of claim 9 wherein the manager selects a first number of folders and writes a first number of scripts; and wherein the MFP processes the document in response to the first number of scripts, and adds the scripted documents to the selected folders in the folder directory.

11. The system of claim 10 further comprising:

at least one computer workstation with an operating system, connected to the MFP device;

a shell extension connected to the computer operating system; and wherein the manager accesses the shell extension to generate the first number of folders in the folder directory, and to write a script for each of the first number of folders.

12. The system of claim 11 further comprising:

an editor to access the shell extension, the editor selecting folders for editing, and editing the scripts in the selected folders.

13. The system of claim 12 wherein the manager saves the folders in the folder directory.

14. A system for managing workflow using a plurality of scripts, the system comprising:

at least one computer workstation with an operating system;

a shell extension connected to the computer operating system;

a folder directory including a plurality of folders with a corresponding plurality of scripts;

a manager accessing the shell extension to generate a first number of folders in the folder directory, to write a script for each of the first number of folders, to save the folders in the folder directory, and to select a plurality of folders in the folder directory; and at least one multifunctional peripheral (MFP) device connected to the computer workstation to process an accepted document using a plurality of scripts associated with the plurality of selected folders, to generate a plurality of scripted documents from the accepted document, and to add the plurality of scripted documents to the selected folders.

* * * * *